June 5, 1923.
H. E. WALDRON
WATER HEATING APPARATUS
Filed Dec. 14, 1921  2 Sheets-Sheet 1
1,458,090
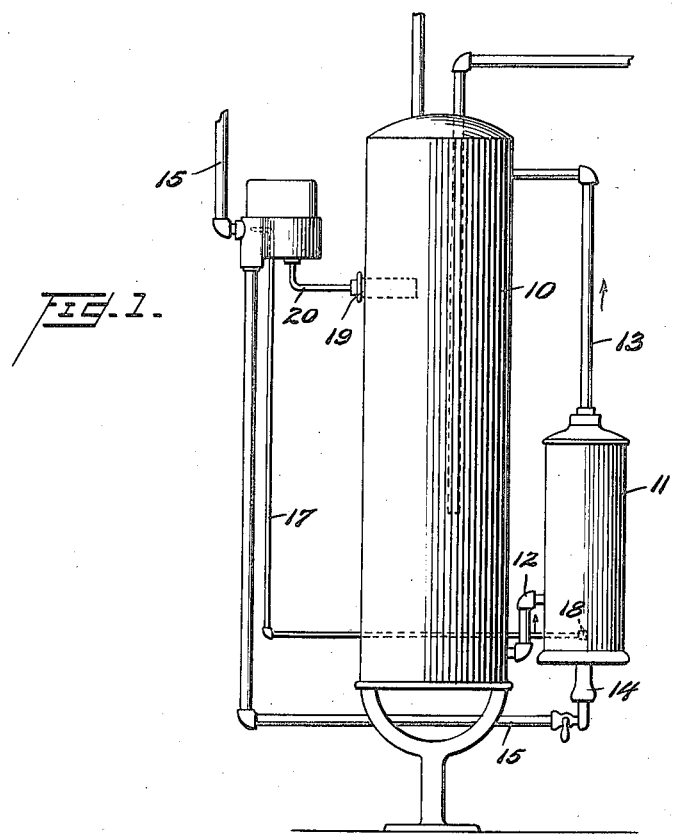
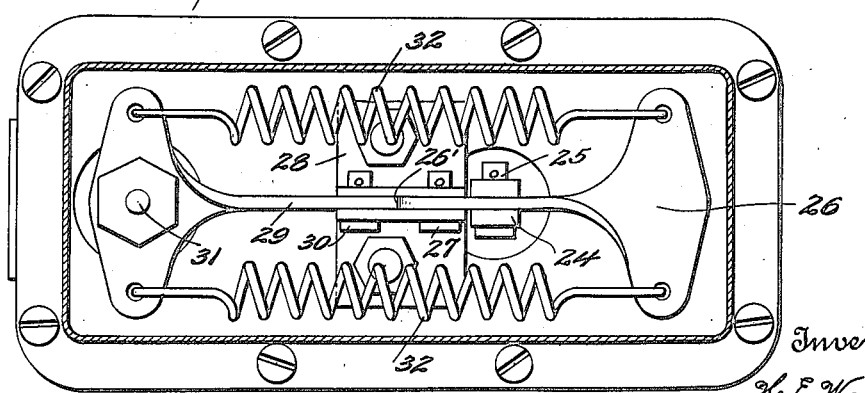
Inventor
H. E. Waldron,
By Watson, Coit, Morse & Grindle,
Attorneys.

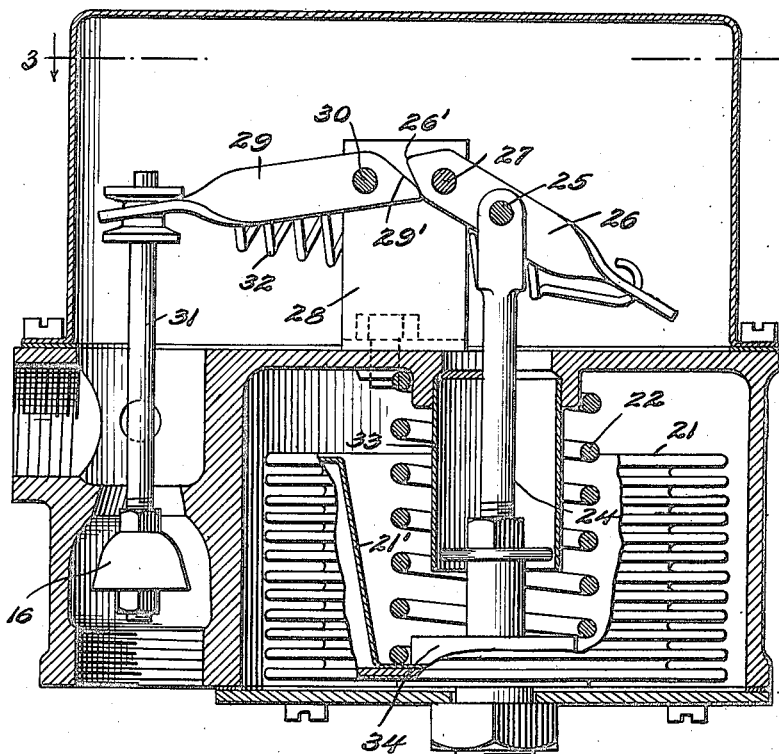
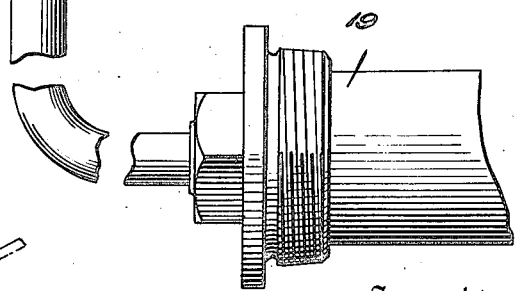
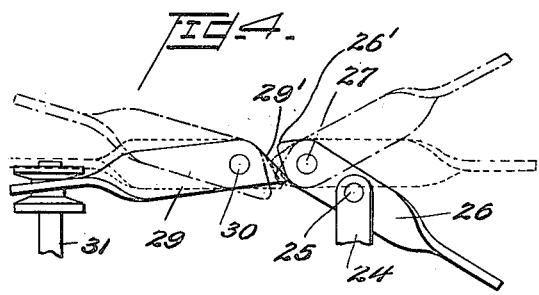

Patented June 5, 1923.

1,458,090

UNITED STATES PATENT OFFICE.

HAROLD EDWARD WALDRON, OF HIGHLAND PARK, MICHIGAN.

WATER-HEATING APPARATUS.

Application filed December 14, 1921. Serial No. 522,351.

*To all whom it may concern:*

Be it known that I, HAROLD E. WALDRON, a citizen of the United States, and residing at Highland Park, Wayne County, State of Michigan, have invented certain new and useful Improvements in Water-Heating Apparatus, of which the following is a specification.

The present invention relates to water heating apparatus.

A well known type of apparatus of this character heretofore designed for providing hot water in homes, stores, etc., comprises a storage tank, a gas burning water heater positioned adjacent the same and connected thereto by suitable pipes, a valve controlling the flow of gas to the water heater, a thermostat positioned to be affected by the variations of temperature in the storage tank, and suitable connections between the thermostat and control valve whereby the valve is opened and closed by the action of the thermostat. In most prior devices of this character the valve controlling the flow of gas has been so connected to the thermostat that it is thrown either into closed position or into wide open position by a snap action mechanism. It is found with such structures that the sudden closing of the valve frequently causes an explosion to occur at the burner accompanied by a popping noise, and resulting in a rush of air to the burner which frequently causes the extinguishment of the pilot light.

In accordance with the present invention the thermostat is operatively connected to the control valve by means which causes the valve to be given an initial slow closing movement, gradually throttling the gas suplied to the burner, and which movement is terminated by a quick or snap movement to fully closed position. By operating the valve in this manner it is found that the small explosion accompanied by objectionable popping noises, and blowing out of the pilot light, are largely eliminated. The parts are so designed that the valve is given a quick and positive opening movement, as has been found to be the best practice in such apparatus.

The invention may be embodied in various forms, one of which is disclosed in the following description and in the drawings which accompany the same in which:

Figure 1 shows in side elevation the storage tank and the associated heating means;

Figure 2 illustrates, partially in section and partially in elevation, the control valve, thermostat and connecting mechanism;

Figure 3 is a section on line 3—3 of Figure 2; and

Figure 4 is a diagrammatic representation of the valve operating mechanism, showing it in its different positions.

The storage water tank is indicated at 10 in the drawings and the water heater at 11, the tank and water heater being connected by the usual pipes 12 and 13 through which water may flow (in the direction of the arrows). The gas burner 14 of the water heater is supplied with gas by means of a pipe 15 and the flow of gas through this pipe is controlled by a valve 16, clearly shown in Figure 2. A gas line 17 connects pipe 15 to a pilot burner 18, the connection between line 17 and pipe 15 being open at all times and not controlled by valve 16. The thermostat comprises essentially a bulb 19 for a volatile fluid which bulb extends through a hole in the side of the tank and which communicates by means of a tube 20 with an expansible chamber 21 having corrugated side walls. When the temperature of the water in the tank 10 reaches a predetermined degree the liquid in bulb 19 vaporizes and causes the movement upwardly (Figure 2) of the upper end wall of chamber 21. A spring 22 normally tends to return this end wall to the position in which it is illustrated, and as soon as the water in tank 10 cools sufficiently the gas in bulb 19 liquefies and the spring 22 is effective to perform this function. It will be seen that the upper end wall of chamber 21 has a central depressed portion 21′ to receive spring 22 and the circular lower end of this depression or pocket supports the base of a vertically extending stem 24 which stem moves upwardly and downwardly as the chamber 21 expands and contracts.

The upper end of stem 24 is pivotally connected at 25 to a cam lever 26 which is mounted to rotate about a fixed pivot 27 supported upon a standard or pedestal 28. The inner end of this cam lever is pointed and the point 26′ is adapted to serve as a cam for operating a second or valve lever 29, pivoted at 30 to the standard 28. The lever 29 terminates at its inner end in a cam surface 29' which is diagonal to the longitudinal axis of the lever and its outer end which is turned at right angles to the main portion of the lever, is perforated to receive the end of the valve stem 31 to the lower end of which valve 16 is secured. Lever 26 is also in the form of a plate having its outer end twisted at right angles to the body thereof. The levers 26 and 29 are T-shaped, as viewed from above.

Coiled tension springs 32 connect the ends of the levers and constantly exert a force tending to draw these ends together. The valve 16 is shown in Figure 2 to be in its fully open position so that gas is flowing freely to the heater. As soon as the water in tank 10 has been raised in temperature to the desired point the liquid in bulb 19 begins to vaporize, the chamber 21 to expand, and the lever 26 to rotate upwardly about its pivot 27. The point 26' of this cam lever soon comes in contact with the cam surface 29' of the valve operating lever to cause the upward rotation of lever 29 about pivot 30 and the movement of valve 16 toward its seat. Springs 32 of course constantly oppose such movement. This action continues until the levers are substantially in the intermediate positions shown in Figure 4, but upon a slight further movement upwardly of lever 26 the axes of springs 32 pass over the dead center of the lever system and instantly act on lever 29 to cause it to move rapidly upward to close the valve 16, this upward movement of lever 29 being unopposed. The levers then occupy the upper positions (Figure 4). As the water gradually cools in the tank 10 the stem 24 descends, drawing downwardly with it the lever 26. The cam point 26' is not acting, however, on the cam surface 29' in this return movement and the valve is not opened until the axes of springs 32 have crossed the dead center, whereupon the valve is moved instantly from its fully closed position to its full open position. The tube 33 surrounding the spindle 24 serves as a stop against which the ring 34, secured to the spindle may abut to prevent excessive upward movement of the spindle.

It is found that in operating the valve in this manner the objectionable explosion, accompanied by popping noises are eliminated as well as the frequent extinguishment of the pilot burner, and that the mechanism has other advantages. It will be obvious that changes may be effected in the design and arrangement of the component parts of the invention which is not limited in its scope to that embodiment illustrated and described.

Having thus described my invention what is claimed as new and desired to be secured by Letters Patent is:

1. In a storage water heater apparatus, in combination, a storage tank, a water heater connected thereto, a thermostat responsive to the temperature in the storage tank, means for supplying gaseous fuel to the water heater including a control valve, and connections between the thermostat and valve whereby the valve is given in closing an initial slow movement and a final quick movement to closed position and is given in opening a quick movement to full open position.

2. In a storage water heater apparatus, in combination, a storage tank, a water heater connected thereto, a thermostat responsive to the temperature in the storage tank, means for supplying gaseous fuel to the water heater including a control valve, and means connecting the thermostat and valve whereby the valve is gradually moved toward its seat in closing through a predetermined distance, and is then quickly seated, and is given in opening a continuous movement to full open position.

3. In a storage water heater apparatus, in combination, a storage tank, a water heater connected thereto, a thermostat responsive to the temperature in the storage tank, means for supplying gaseous fuel to the water heater including a control valve, and connections between the thermostat and valve whereby the latter in moving in one direction is given an initial slow movement and a final quick action, and in moving in the other direction is given a continuous movement.

4. In a storage water heater apparatus, in combination, a storage tank, a water heater connected thereto, a thermostat responsive to the temperature in the storage tank, means for supplying gaseous fuel to the water heater, including a control valve, and connections between the thermostat and valve including a valve operating lever and a thermostatically operated lever adapted to operatively engage the valve operating lever to effect a slow movement of the same, when moved in one direction.

5. In a storage water heater apparatus, in combination, a storage tank, a water heater connected thereto, a thermostat responsive to the temperature in the storage tank, means for supplying gaseous fuel to the water heater, including a control valve, and connections between the thermostat and valve including a valve operating lever, a thermostatically operated lever for giving said valve operating lever an initial slow movement toward closed position, and means for giving the valve a final rapid movement to fully closed position.

6. In a storage water heater apparatus, in combination, a storage tank, a water heater connected thereto, a thermostat responsive to the temperature in the storage tank, means for supplying gaseous fuel to the water heater, including a control valve, and connections between the thermostat and valve including a valve operating member, thermostatically operated means acting on said member for partially closing said valve, and second means for effecting the complete closure thereof.

7. In a storage water heater apparatus, in combination, a storage tank, a water heater connected thereto, a thermostat responsive to the temperature in the storage tank, means for supplying gaseous fuel to the water heater, including a control valve, and connections between the thermostat and valve including a valve operating member, thermostatically operated means acting on said member for partially closing said valve, and a spring connected to the thermostatically operated means for moving said valve operating member to quickly close the valve when said means reaches a predetermined position.

8. In a storage water heater apparatus, in combination, a storage tank, a water heater connected thereto, a thermostat responsive to the temperature in the storage tank, means for supplying gaseous fuel to the water heater, including a control valve, and connections between the thermostat and valve including a valve operating lever having a bearing surface, a lever operated by said thermostat and having a cam adapted to engage said bearing surface when moving in one direction to cause said valve operating lever to partially close said valve, and a spring connecting said levers and adapted to effect the final closing movement of the valve with a snap action, and the entire opening movement of the valve with a snap action.

9. In a storage water heater apparatus, in combination, a storage tank, a water heater connected thereto, a thermostat responsive to the temperature in the storage tank, means for supplying gaseous fuel to the water heater, including a control valve, and connections between the thermostat and valve including a valve operating lever having a bearing surface at one end, a lever operated by said thermostat and having a cam at one end adapted to engage said bearing surface when moving in one direction to cause the valve operating lever to partially close said valve, said levers being pivotally supported adjacent the contacting ends, and a tension spring connecting the outer ends of the levers for effecting a snap opening movement of the valve, and a snap final closing movement thereof.

In testimony whereof I hereunto affix my signature.

HAROLD EDWARD WALDRON.